(12) United States Patent
Romanowsky et al.

(10) Patent No.: US 11,079,651 B2
(45) Date of Patent: Aug. 3, 2021

(54) MULTI-COLOR ELECTRO-OPTIC MEDIA

(71) Applicant: E Ink Corporation, Billerica, MA (US)

(72) Inventors: Mark Benjamin Romanowsky, Cambridge, MA (US); Kosta Ladavac, Somerville, MA (US); Stephen J. Telfer, Arlington, MA (US); Jay William Anseth, Canton, MA (US)

(73) Assignee: E Ink Corporation, Billerica, MA (US)

( * ) Notice: Subject to any disclaimer, the term of this patent is extended or adjusted under 35 U.S.C. 154(b) by 417 days.

(21) Appl. No.: 16/218,668

(22) Filed: Dec. 13, 2018

(65) Prior Publication Data

US 2019/0187535 A1    Jun. 20, 2019

Related U.S. Application Data

(60) Provisional application No. 62/599,058, filed on Dec. 15, 2017.

(51) Int. Cl.
| | | |
|---|---|---|
| *G02F 1/167* | (2019.01) | |
| *G02F 1/16757* | (2019.01) | |
| *G02F 1/1685* | (2019.01) | |
| *G02F 1/1681* | (2019.01) | |
| *G02F 1/17* | (2019.01) | |
| *G02F 1/1675* | (2019.01) | |
| *G02F 1/1676* | (2019.01) | |

(52) U.S. Cl.
CPC .......... *G02F 1/16757* (2019.01); *G02F 1/167* (2013.01); *G02F 1/1676* (2019.01); *G02F 1/1681* (2019.01); *G02F 1/1685* (2019.01); *G02F 1/172* (2013.01); *G02F 2001/1678* (2013.01); *G02F 2203/34* (2013.01)

(58) Field of Classification Search
CPC ............. G02F 1/167; G02F 2001/1678; G02F 1/1681; G02F 1/16757; G02F 1/172; G02F 1/1685; G02F 2203/34
USPC ....................................... 359/296
See application file for complete search history.

(56) References Cited

U.S. PATENT DOCUMENTS

| | | |
|---|---|---|
| 4,418,346 A | 11/1983 | Batchelder |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 6,017,584 A | 1/2000 | Albert |
| 6,054,071 A | 4/2000 | Mikkelsen, Jr. |

(Continued)

OTHER PUBLICATIONS

Wood, D., "An Electrochromic Renaissance?" Information Display, 18(3), 24 (Mar. 2002) Mar. 1, 2002.

(Continued)

*Primary Examiner* — Evelyn A Lester
(74) *Attorney, Agent, or Firm* — Brian D. Bean

(57) ABSTRACT

An electro-optic medium that may be incorporated into an electro-optic display. The medium includes a first microcapsule containing at least one of a first dispersion of colored particles and a colored fluid and an encapsulated second dispersion that may include the first microcapsule and a plurality of electrophoretic particles. The colored particles of the first dispersion may include one or more sets of differently colored electrophoretic particles. The second dispersion may be encapsulated within a second microcapsule or a microcell, for example.

18 Claims, 6 Drawing Sheets

(56) References Cited

U.S. PATENT DOCUMENTS

| | | |
|---|---|---|
| 6,055,091 A | 4/2000 | Sheridon |
| 6,067,185 A | 5/2000 | Albert |
| 6,097,531 A | 8/2000 | Sheridon |
| 6,128,124 A | 10/2000 | Silverman |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,184,856 B1 | 2/2001 | Gordon, II |
| 6,225,971 B1 | 5/2001 | Gordon, II |
| 6,249,271 B1 | 6/2001 | Albert |
| 6,271,823 B1 | 8/2001 | Gordon, II |
| 6,301,038 B1 | 10/2001 | Fitzmaurice |
| 6,327,072 B1 | 12/2001 | Comiskey |
| 6,392,785 B1 | 5/2002 | Albert |
| 6,392,786 B1 | 5/2002 | Albert |
| 6,459,418 B1 | 10/2002 | Comiskey |
| 6,545,797 B2 | 4/2003 | Chen |
| 6,664,944 B1 | 12/2003 | Albert |
| 6,788,452 B2 | 9/2004 | Liang |
| 6,825,829 B1 | 11/2004 | Albert |
| 6,839,158 B2 | 1/2005 | Albert et al. |
| 6,864,875 B2 | 3/2005 | Drzaic |
| 6,866,760 B2 | 3/2005 | Paolini, Jr. |
| 6,870,657 B1 | 3/2005 | Fitzmaurice |
| 6,914,714 B2 | 7/2005 | Chen |
| 6,922,276 B2 | 7/2005 | Zhang |
| 6,930,818 B1 | 8/2005 | Liang |
| 6,950,220 B2 | 9/2005 | Abramson et al. |
| 6,958,848 B2 | 10/2005 | Cao et al. |
| 6,972,893 B2 | 12/2005 | Chen |
| 6,982,178 B2 | 1/2006 | LeCain et al. |
| 6,987,603 B2 | 1/2006 | Paolini, Jr. |
| 7,002,728 B2 | 2/2006 | Pullen |
| 7,012,600 B2 | 3/2006 | Zehner |
| 7,038,656 B2 | 5/2006 | Liang |
| 7,038,670 B2 | 5/2006 | Liang |
| 7,046,228 B2 | 5/2006 | Liang |
| 7,052,571 B2 | 5/2006 | Wang |
| 7,061,663 B2 | 6/2006 | Cao et al. |
| 7,071,913 B2 | 7/2006 | Albert |
| 7,072,095 B2 | 7/2006 | Liang |
| 7,075,502 B1 | 7/2006 | Drzaic |
| 7,079,305 B2 | 7/2006 | Paolini, Jr. et al. |
| 7,109,968 B2 | 9/2006 | Albert et al. |
| 7,110,164 B2 | 9/2006 | Paolini, Jr. et al. |
| 7,112,114 B2 | 9/2006 | Liang |
| 7,116,318 B2 | 10/2006 | Amundson |
| 7,144,942 B2 | 12/2006 | Zang |
| 7,158,282 B2 | 1/2007 | Liang |
| 7,167,155 B1 | 1/2007 | Albert |
| 7,170,670 B2 | 1/2007 | Webber |
| 7,184,197 B2 | 2/2007 | Liang et al. |
| 7,202,991 B2 | 4/2007 | Zhang et al. |
| 7,236,291 B2 | 6/2007 | Kaga et al. |
| 7,236,292 B2 | 6/2007 | LeCain |
| 7,242,513 B2 | 7/2007 | Albert et al. |
| 7,304,634 B2 | 12/2007 | Albert et al. |
| 7,312,784 B2 | 12/2007 | Baucom |
| 7,321,459 B2 | 1/2008 | Masuda |
| 7,339,715 B2 | 3/2008 | Webber |
| 7,385,751 B2 | 6/2008 | Chen |
| 7,391,555 B2 | 6/2008 | Albert et al. |
| 7,411,719 B2 | 8/2008 | Paolini, Jr. |
| 7,420,549 B2 | 9/2008 | Jacobson |
| 7,443,571 B2 | 10/2008 | LeCain et al. |
| 7,453,445 B2 | 11/2008 | Amundson |
| 7,477,444 B2 | 1/2009 | Cao et al. |
| 7,492,505 B2 | 2/2009 | Liang |
| 7,513,813 B2 | 4/2009 | Paolini, Jr. et al. |
| 7,535,624 B2 | 5/2009 | Amundson et al. |
| 7,561,324 B2 | 7/2009 | Duthaler et al. |
| 7,636,191 B2 | 12/2009 | Duthaler |
| 7,649,666 B2 | 1/2010 | Isobe et al. |
| 7,667,684 B2 | 2/2010 | Jacobson |
| 7,679,814 B2 | 3/2010 | Paolini, Jr. |
| 7,684,108 B2 | 3/2010 | Wang |
| 7,715,088 B2 | 5/2010 | Liang |
| 7,728,811 B2 | 6/2010 | Albert et al. |
| 7,729,039 B2 | 6/2010 | LeCain et al. |
| 7,791,782 B2 | 9/2010 | Paolini, Jr. |
| 7,791,789 B2 | 9/2010 | Albert |
| 7,800,813 B2 | 9/2010 | Wu |
| 7,821,702 B2 | 10/2010 | Liang |
| 7,826,129 B2 | 11/2010 | Wu |
| 7,839,564 B2 | 11/2010 | Whitesides et al. |
| 7,843,621 B2 | 11/2010 | Danner et al. |
| 7,843,624 B2 | 11/2010 | Danner |
| 7,848,007 B2 | 12/2010 | Paolini, Jr. |
| 7,910,175 B2 | 3/2011 | Webber |
| 7,952,790 B2 | 5/2011 | Honeyman |
| 7,955,532 B2 | 6/2011 | Liang |
| 7,956,841 B2 | 6/2011 | Albert |
| 7,982,941 B2 | 7/2011 | Lin |
| 8,009,348 B2 | 8/2011 | Zehner |
| 8,034,209 B2 | 10/2011 | Danner |
| 8,035,886 B2 | 10/2011 | Jacobson |
| 8,040,594 B2 | 10/2011 | Paolini, Jr. |
| 8,054,526 B2 | 11/2011 | Bouchard |
| 8,068,272 B2 | 11/2011 | LeCain et al. |
| 8,077,381 B2 | 12/2011 | LeCain et al. |
| 8,098,418 B2 | 1/2012 | Paolini, Jr. |
| 8,129,655 B2 | 3/2012 | Jacobson et al. |
| 8,159,636 B2 | 4/2012 | Sun |
| 8,177,942 B2 | 5/2012 | Paolini, Jr. |
| 8,213,076 B2 | 7/2012 | Albert |
| 8,363,299 B2 | 1/2013 | Paolini, Jr. |
| 8,390,301 B2 | 3/2013 | Danner |
| 8,422,116 B2 | 4/2013 | Sprague |
| 8,441,714 B2 | 5/2013 | Paolini, Jr. |
| 8,441,716 B2 | 5/2013 | Paolini, Jr. |
| 8,446,664 B2 | 5/2013 | Chen |
| 8,466,852 B2 | 6/2013 | Drzaic |
| 8,482,835 B2 | 7/2013 | LeCain |
| 8,503,063 B2 | 8/2013 | Sprague |
| 8,576,470 B2 | 11/2013 | Paolini, Jr. |
| 8,576,475 B2 | 11/2013 | Huang |
| 8,576,476 B2 | 11/2013 | Telfer, Jr. |
| 8,593,721 B2 | 11/2013 | Albert |
| 8,605,354 B2 | 12/2013 | Zhang |
| 8,649,084 B2 | 2/2014 | Wang |
| 8,670,174 B2 | 3/2014 | Sprague |
| 8,704,756 B2 | 4/2014 | Lin |
| 8,717,664 B2 | 5/2014 | Wang |
| 8,786,929 B2 | 7/2014 | LeCain |
| 8,786,935 B2 | 7/2014 | Sprague |
| 8,797,634 B2 | 8/2014 | Paolini, Jr. |
| 8,810,899 B2 | 8/2014 | Sprague |
| 8,830,553 B2 | 9/2014 | Patry, Jr. |
| 8,830,559 B2 | 9/2014 | Honeyman |
| 8,854,721 B2 | 10/2014 | Danner |
| 8,873,129 B2 | 10/2014 | Paolini, Jr. |
| 8,902,153 B2 | 12/2014 | Bouchard |
| 8,902,491 B2 | 12/2014 | Wang |
| 8,917,439 B2 | 12/2014 | Wang |
| 8,964,282 B2 | 2/2015 | Wang |
| 9,005,494 B2 | 4/2015 | Valianatos |
| 9,013,783 B2 | 4/2015 | Sprague |
| 9,075,280 B2 | 7/2015 | Whitesides |
| 9,116,412 B2 | 8/2015 | Lin |
| 9,146,439 B2 | 9/2015 | Zhang |
| 9,164,207 B2 | 10/2015 | Honeyman |
| 9,170,467 B2 | 10/2015 | Whitesides |
| 9,170,468 B2 | 10/2015 | Lin |
| 9,182,646 B2 | 11/2015 | Paolini, Jr. |
| 9,195,111 B2 | 11/2015 | Anseth, Jr. |
| 9,199,441 B2 | 12/2015 | Danner |
| 9,238,340 B2 | 1/2016 | Kayal |
| 9,268,191 B2 | 2/2016 | Paolini, Jr. |
| 9,279,906 B2 | 3/2016 | Kang |
| 9,285,649 B2 | 3/2016 | Du |
| 9,293,511 B2 | 3/2016 | Jacobson |
| 9,341,916 B2 | 5/2016 | Telfer et al. |

(56) References Cited

U.S. PATENT DOCUMENTS

| | | | |
|---|---|---|---|
| 9,360,733 B2 | 6/2016 | Wang | |
| 9,361,836 B1 | 6/2016 | Telfer, Jr. | |
| 9,383,623 B2 | 7/2016 | Lin | |
| 9,423,666 B2 | 8/2016 | Wang | |
| 9,459,510 B2 | 10/2016 | Lin | |
| 9,506,243 B1* | 11/2016 | Harris | G02F 1/0147 |
| 9,513,527 B2 | 12/2016 | Chan | |
| 9,541,814 B2 | 1/2017 | Lin | |
| 9,552,780 B2 | 1/2017 | Telfer, Jr. | |
| 9,554,495 B2 | 1/2017 | Danner | |
| 9,671,668 B2 | 6/2017 | Chan | |
| 9,697,778 B2 | 7/2017 | Telfer | |
| 9,733,540 B2 | 8/2017 | LeCain et al. | |
| 9,740,076 B2 | 8/2017 | Paolini | |
| 9,759,980 B2 | 9/2017 | Du | |
| 9,812,073 B2 | 11/2017 | Lin | |
| 9,921,451 B2 | 3/2018 | Telfer et al. | |
| 2005/0156340 A1 | 7/2005 | Valianatos et al. | |
| 2005/0168799 A1* | 8/2005 | Whitesides | C09C 1/00 359/296 |
| 2006/0024437 A1* | 2/2006 | Pullen | B82Y 30/00 427/216 |
| 2007/0091417 A1 | 4/2007 | Cao et al. | |
| 2007/0237962 A1 | 10/2007 | Liang | |
| 2008/0037107 A1* | 2/2008 | Kanbe | G02F 1/167 359/296 |
| 2008/0043318 A1 | 2/2008 | Whitesides | |
| 2008/0048970 A1 | 2/2008 | Drzaic | |
| 2008/0130092 A1 | 6/2008 | Whitesides | |
| 2009/0122389 A1 | 5/2009 | Whitesides | |
| 2009/0168067 A1 | 7/2009 | LeCain et al. | |
| 2009/0225398 A1 | 9/2009 | Duthaler | |
| 2010/0156780 A1 | 6/2010 | Jacobson | |
| 2011/0043543 A1 | 2/2011 | Chen | |
| 2011/0134508 A1* | 6/2011 | Kawashima | G02F 1/167 359/296 |
| 2011/0164301 A1 | 7/2011 | Paolini, Jr. | |
| 2011/0286081 A1 | 11/2011 | Jacobson | |
| 2011/0304903 A1* | 12/2011 | Jun | G02F 1/1676 359/296 |
| 2012/0057218 A1* | 3/2012 | Setagawa | G02F 1/167 359/296 |
| 2012/0326957 A1 | 12/2012 | Drzaic | |
| 2013/0242378 A1 | 9/2013 | Paolini, Jr. | |
| 2013/0278995 A1 | 10/2013 | Drzaic | |
| 2014/0055840 A1 | 2/2014 | Zang | |
| 2014/0078576 A1 | 3/2014 | Sprague | |
| 2014/0362213 A1 | 12/2014 | Tseng | |
| 2015/0103394 A1* | 4/2015 | Wang | G02F 1/167 359/296 |
| 2015/0118390 A1 | 4/2015 | Rosenfeld | |
| 2015/0124345 A1 | 5/2015 | Rosenfeld | |
| 2015/0268531 A1 | 9/2015 | Wang | |
| 2015/0301246 A1 | 10/2015 | Zang | |
| 2016/0026062 A1 | 1/2016 | Zhang | |
| 2016/0048054 A1 | 2/2016 | Danner | |
| 2016/0091770 A1* | 3/2016 | Bouchard | G09G 3/344 359/296 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991). Oct. 24, 1991.

Bach, U. et al., "Nanomaterials-Based Electrochromics for Paper-Quality Displays", Adv. Mater, vol. 14, No. 11, pp. 845-848 (Jun. 2002). Jun. 5, 2002.

Hayes, R.A. et al., "Video-Speed Electronic Paper Based on Electrowetting", Nature, vol. 425, No. 25, pp. 383-385 (Sep. 2003). Sep. 25, 2003.

Kitamura, T. et al., "Electrical toner movement for electronic paper-like display", Asia Display/IDW '01, pp. 1517-1520, Paper HCS1-1 (2001). Jan. 1, 2001.

Yamaguchi, Y. et al., "Toner display using insulative particles charged triboelectrically", Asia Display/IDW '01, pp. 1729-1730, Paper AMD4-4 (2001). Jan. 1, 2001.

\* cited by examiner

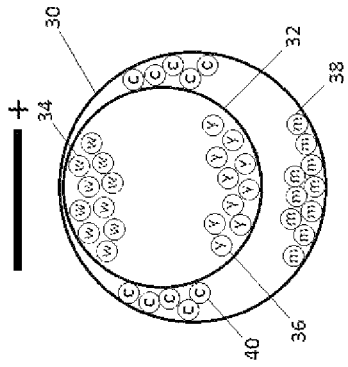
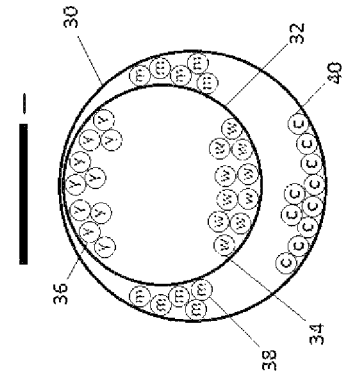
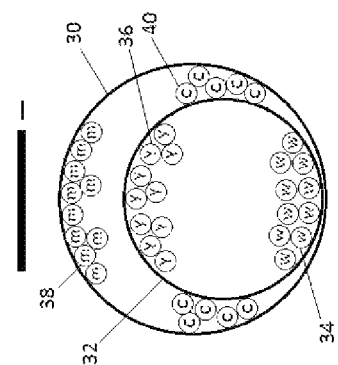
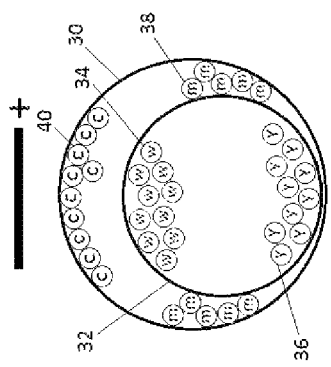
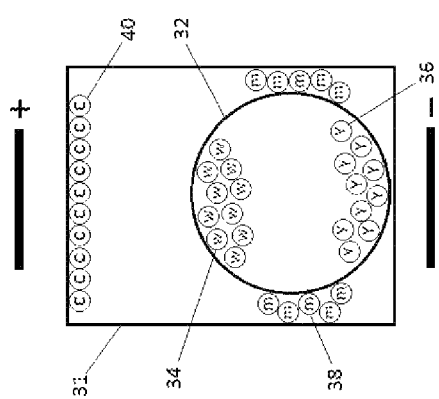
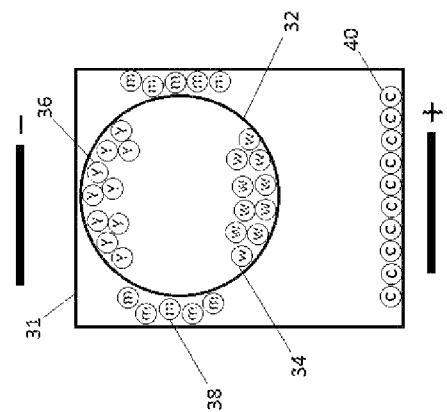
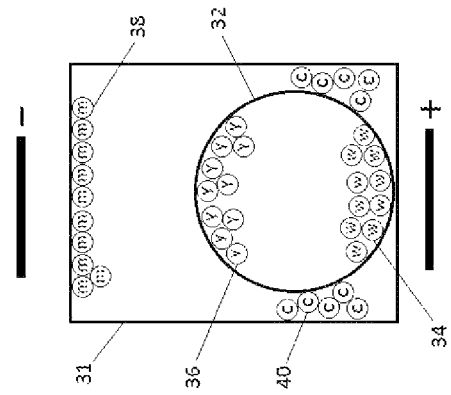
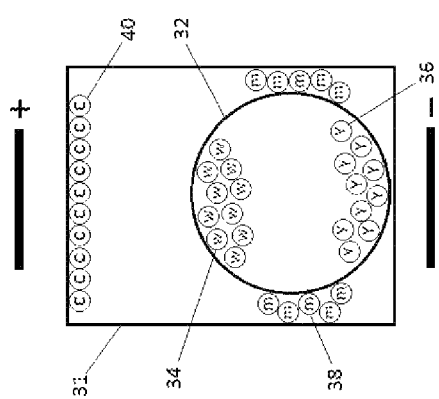

MULTI-COLOR ELECTRO-OPTIC MEDIA

CROSS REFERENCE TO RELATED APPLICATION

This application claims the benefit of and priority to U.S. Provisional Application No. 62/599,058, filed on Dec. 15, 2017, the entire content of which is incorporated by reference herein.

FIELD OF THE INVENTION

The present invention relates to multi-color electro-optic media and to color displays incorporating such media. Specifically, the present invention relates to encapsulated electro-optic media. As used herein, "color" is intended to include black and white.

BACKGROUND OF INVENTION

The term "electro-optic", as applied to a material or a display, is used herein in its conventional meaning in the imaging art to refer to a material having first and second display states differing in at least one optical property, the material being changed from its first to its second display state by application of an electric field to the material. The optical property is typically color perceptible to the human eye.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Particle-based electrophoretic displays, in which a plurality of charged particles move through a fluid under the influence of an electric field, have been the subject of intense research and development for a number of years. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane.

Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728; and 7,679,814;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,184,197; 7,202,991; 7,242,513; 7,304,634; 7,339,715; 7,391,555; 7,411,719; 7,477,444; 7,561,324; 7,848,007; 7,910,175; 7,952,790; 7,955,532; 8,035,886; 8,129,655; 8,446,664; and 9,005,494; and U.S. Patent Applications Publication Nos. 2005/0156340; 2007/0091417; 2008/0130092; 2009/0122389; and 2011/0286081;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos. 7,116,318; and 7,535,624;

(g) Color formation and color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 7,012,600; and 7,453,445;

(i) Applications of displays; see for example U.S. Pat. No. 7,312,784; and U.S. Patent Application Publication No. 2006/0279527.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

Although electrophoretic media are often opaque (since, for example, in many electrophoretic media, the particles substantially block transmission of visible light through the display) and operate in a reflective mode, many electrophoretic displays can be made to operate in a so-called "mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Electrophoretic media operating in shutter mode may be useful in multi-layer structures for full color displays; in such structures, at least one layer adjacent the viewing surface of the display operates in shutter mode to expose or conceal a second layer more distant from the viewing surface.

As already indicated, an encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

There is today an increasing demand for color in all displays. Users familiar with color televisions, color computer displays and color displays on cellular telephones and other portable electronic devices may regard monochrome display as lacking something in visual appeal even in applications such as electronic book readers, where the display aims to reproduce the look of a printed book, most of which are still printed in monochrome.

In conventional printing, full color images of high quality are formed by providing sub-images in each of three subtractive primary colors, typically cyan, magenta and yellow ("CMY") (black may be included as a fourth primary in a "CMYK" system) that are overlaid (i.e., more than one color can be present at any point on the page) in such a way that light is filtered through each sub-image before being reflected back from the underlying white paper to the viewer. (Thus, a so-called "four color", CMYK system is in reality a five-color system; the white color of the underlying paper is part of the color formation system, as is readily appreciated from the fact that this white color appears where no ink whatever is present.) In this arrangement of three or four overlaid sub-images, no area of the printed paper absorbs light unnecessarily, and thus an image of maximum brightness is obtained.

Those skilled in the imaging art know that it is necessary to provide independent addressing of each primary color in order to render a full-color image. This is illustrated graphically in FIG. 8 of the accompanying drawings, which shows a "color cube" in which the vertices correspond to white, the three subtractive primary colors (yellow, magenta, and cyan), the three additive primary colors (red, green and blue) and black. As shown by the arrows, any point inside or on the surface of the color cube can be defined by three (orthogonal) co-ordinates, namely, the distances along the white-yellow axis, the white-magenta axis, and the white-cyan axis. These distances correspond to different optical densities in the subtractive primary colors, ranging from zero (i.e., white) to about 2 (corresponding 99% absorption of light of the corresponding additive primary spectral range). The number of discretely addressed independent states required to render the full color gamut of a display is the number of yellow states plus the number of magenta states plus the number of cyan states. The number of colors that can be rendered, however, is the product of these three numbers. Thus, for example, a display may be chosen to render 2 yellow states (since the human visual system is relatively insensitive to spatial variation in blue light, the absence of which corresponds to the yellow subtractive primary color) and $2^4=16$ states of each of magenta and cyan. The waveform driving the display would be required to render 34 different states in total, but would be able to address $2^9=512$ different colors.

To make an acceptable color display, we need to make capsules with independently addressable colors. Each capsule must be switchable to as many colors as possible. However, the capsules still have to be amenable to coating using our current methods, and capable of switching using the backplane electronics we currently use. One known solution for providing independent addressing of primarily colors in a full color display is based on providing multiple layers of microencapsulated electrophoretic media capable of shuttering, such as the solution disclosed in U.S. Pat. No. 8,576,476. An upper layer of capsules may contain opaque electrophoretic particles of a selected color or "shuttered" open to reveal another layer of microcapsules underneath containing electrophoretic particles containing a different color. In such a device, there is a limit to the amount of pigment loading possible for the upper layer because only a small amount of pigment can be moved such that it is effectively hidden from view. As a result, microcapsules containing insufficient pigment may have limited hiding power when closed, and over-loaded microcapsules in the shuttering layer may fail to open fully, spoiling the color of the lower microcapsule layer.

Accordingly, there is still a need for improved full-color image displays. Specifically, there is a need for improved full-color electrophoretic displays with independently addressable colors that is controllable with currently available electronics/backplanes and that may be made using cost-effective printing and manufacturing techniques.

SUMMARY OF INVENTION

In one aspect, this invention provides an electro-optic medium that may be incorporated into an electro-optic display. The medium may comprise a first microcapsule containing at least one of a first dispersion of colored particles and a colored fluid and an encapsulated second dispersion comprising the first microcapsule and a plurality of electrophoretic particles. The colored particles of the first dispersion may comprise one or more sets of differently colored electrophoretic particles. The second dispersion may be encapsulated within a second microcapsule or a microcell, for example.

These and other aspects of the present invention will be apparent in view of the following description.

BRIEF DESCRIPTION OF THE DRAWINGS

The drawing Figures depict one or more implementations in accord with the present concepts, by way of example only, not by way of limitations. In the figures, like reference numerals refer to the same or similar elements.

FIG. 3A is a schematic cross-sectional view of an encapsulated microcapsule according to a third embodiment of the present invention.

FIG. 3B is a schematic cross-sectional view of the microcapsule of FIG. 3A switched to a second optical state.

FIG. 3C is a schematic cross-sectional view of the microcapsule of FIG. 3A switched to a third optical state.

FIG. 3D is a schematic cross-sectional view of the microcapsule of FIG. 3A switched to a fourth optical state.

FIG. 4A is a schematic cross-section view of an encapsulated microcapsule according to a fourth embodiment of the present invention.

FIG. 4B is a schematic cross-sectional view of the microcapsule of FIG. 4A switched to a second optical state.

FIG. 4C is a schematic cross-sectional view of the microcapsule of FIG. 4A switched to a third optical state.

FIG. 4D is a schematic cross-sectional view of the microcapsule of FIG. 4A switched to a fourth optical state.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. Hereinafter for convenience, a material that selectively absorbs light is referred to as a "pigment", which term should be interpreted to include dyes, photonic crystals, etc., capable of selectively absorbing light.

Referring generally to the figures, the various embodiments of the present invention may comprise one or more opaque objects or light-transmissive inner microcapsules encapsulated within a larger microcapsule or microcell, for example. The inner microcapsules may contain a colored fluid or dispersion of colored pigment particles. The space between the inner microcapsule and the outer microcell or microcapsule may be filled with a fluid that is the same or different than a fluid within the inner microcapsule. For example, the fluid within the outer microcell or microcapsule may be a dispersion that not only contains the inner microcapsule, but may also contain electrophoretic particles. The fluid of the inner microcapsules and outer microcapsules or microcells may be tailored in various ways, for example, tailoring the pigment loading or rheology (viscosity and yield stress), functionalizing the inner microcapsule walls, adjusting the conductivity of the various parts, and varying the sizes and packing densities of the inner microcapsules within the outer microcapsules or microcells. One of the aspects of the various embodiments of the present invention is providing a shuttering mechanism in which the electrophoretic particles within the fluid contained in larger microcapsules or microcells may be hidden behind or forced to the periphery around the opaque objects or microcapsules that are also present in the fluid.

Figure 1A:
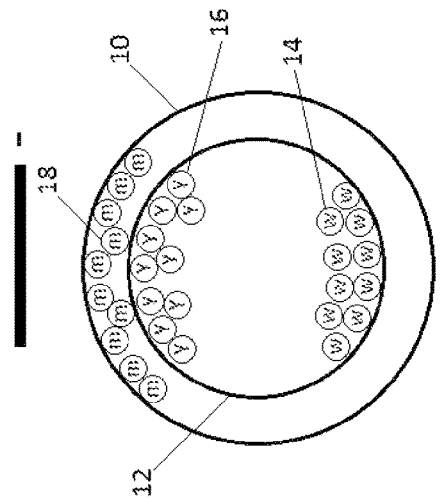
FIG. 1A is a schematic cross-sectional view of an encapsulated microcapsule according to a first embodiment of the present invention.
Figure 1B:
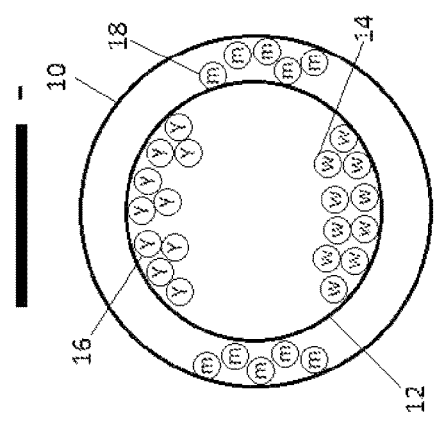
FIG. 1B is a schematic cross-sectional view of the microcapsule of FIG. 1A switched to a second optical state.
Figure 1C:
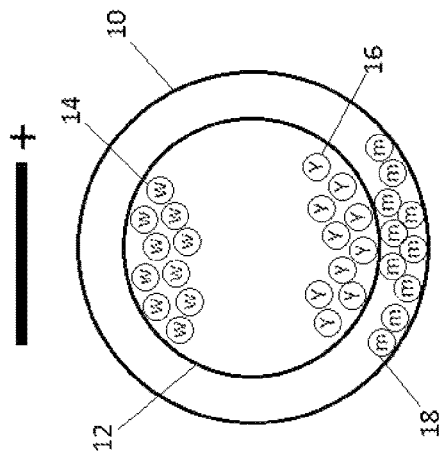
FIG. 1C is a schematic cross-sectional view of the microcapsule of FIG. 1A switched to a third optical state.

Now, referring specifically to FIGS. 1A to 1C, in a first embodiment of the present invention, an outer light-transmissive microcapsule 10 contains an inner light-transmissive microcapsule 12. The inner microcapsule 12 has a slightly smaller diameter than the outer microcapsule 10, such that a space in the shape of a spherical shell is provided between the inner microcapsule 12 and the outer microcapsule 10. The space comprises a fluid, preferably a liquid dispersion comprising a plurality of electrophoretic pigment particles 18 that may be magenta, for example. The inner microcapsule 12 similarly contains a fluid, preferably a liquid dispersion of a first set of electrophoretic pigment particles 14 and second set of electrophoretic pigment particles 16 that may be white and yellow, respectively, for example. The magenta particles 18 may have a similar charge polarity as the yellow particles 16 and an opposite charge polarity relative to the white particles 14. In the embodiment illustrated in FIGS. 1A to 1C, the magenta and yellow particles are positively charged and the white particles are negatively charged. Unlike the electrophoretic particles 14, 16, 18, the inner microcapsule 12 may have little to no charge, such that the microcapsule 12 will not substantially move under the influence of an electric and/or magnetic field within the fluid contained by the outer microcapsule 10.

The optical state of the embodiment of FIGS. 1A to 1C may be switched according to the direction, strength, and/or duration of the field applied by electrodes above and below the electro-optic medium. For example, assuming that the electro-optic medium is viewed from the top down and the top electrode is positive relative to the bottom electrode, the electro-optic medium will be provided with a white state because the white negatively charged pigment particles 14 will migrate to the top of the inner microcapsule 12, while the remaining particles will migrate in the opposite direction, as illustrated in FIG. 1A.

If a short pulse wherein the top electrode is negative relative to the bottom electrode is applied to the electro-optic medium following a long pulse previously described, the electro-optic medium will be switched to a yellow state as illustrated in FIG. 1B because the yellow positively charged particles 16 will migrate to the top of the inner microcapsule 16, while the white particles 14 migrate in the opposite direction. The duration of the short pulse is selected, such that the similarly charged magenta particles 18 will not have sufficient time to migrate above the yellow particles 16 within the space between the inner microcapsule 12 and outer microcapsule 10. This may be facilitated by providing the magenta particles 18 with a lower mobility than the yellow particles 16 through a variety of factors, such as providing magenta particles 18 with a weaker charge than yellow particles 16, increasing the viscosity of the fluid in the spherical shell, or minimizing the volume of the spherical shell to constrict the pathway for the magenta particles 18.

Figure 2A:
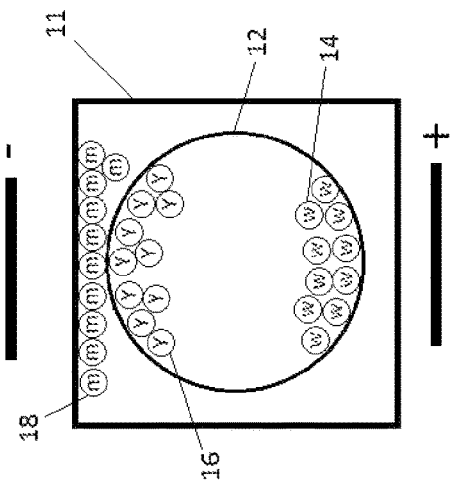
FIG. 2A is a schematic cross-sectional view of an encapsulated microcapsule according to a second embodiment of the present invention.
Figure 2B:
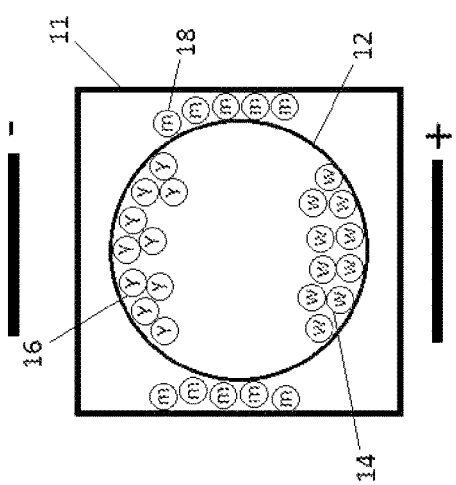
FIG. 2B is a schematic cross-sectional view of the microcapsule of FIG. 2A switched to a second optical state.
Figure 2C:
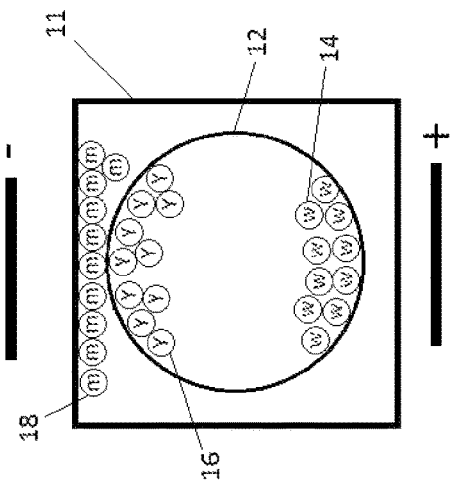
FIG. 2C is a schematic cross-sectional view of the microcapsule of FIG. 2A switched to a third optical state.

Referring to FIG. 1C, after applying a long pulse wherein the top electrode is negative relative to the bottom electrode, the electro-optic medium will switch to magenta because the magenta particles 18 will have sufficient time to migrate above the yellow particles 16. FIGS. 2A to 2C illustrate an embodiment that comprises the same features and operates in the same fashion as the embodiment in FIGS. 1A to 1C, except that the outer microcapsule 10 has been replaced with a microcell 11.

In another embodiment of the present invention, the inner microcapsule may be provided with a charged surface, such that the inner microcapsule may migrate within the outer microcapsule or microcell. For example, referring to FIGS. 3A to 3D, an inner microcapsule 32 may have a negatively charged surface and contain a fluid, preferably a liquid, having a plurality of electrophoretic particles dispersed within the fluid, such as negatively charged white pigment particles 34 and positively charged yellow pigment particles 36. The inner microcapsule 32 may be encapsulated within a larger outer microcapsule 30 along with a fluid, such as a liquid, that also contains a plurality of electrophoretic particles, such as negatively charged magenta pigment particles 38 and positively charged cyan pigment particles 40. As previously noted, the fluid within the inner microcapsule 32 and the outer microcapsule 30 may the same or different.

The optical state of the embodiment illustrated in FIGS. 3A to 3D may be switched among white, yellow, magenta, and cyan. For example, again assuming that the electro-optic medium is viewed from the top-down in FIG. 3A, when a long pulse is applied wherein the top electrode is positive relative to the bottom electrode, the negatively charged inner microcapsule 32 and white pigment particles 34 will migrate towards the top electrode, while the yellow pigment particles 36 and magenta pigment particles 38 will migrate toward the bottom electrode resulting in a white state. Because the inner microcapsule 32 has migrated to the top of the outer microcapsule 30, the cyan pigment particles 40 will be forced to the periphery within the space around the inner microcapsule 32.

If a short pulse is applied to the electro-optic medium in the white state wherein the top electrode is negative relative to the bottom electrode, the yellow pigment particles 36 and white pigment particles 40 will switch places; however, the short pulse will not provide a sufficient force to cause the inner microcapsule 32 to migrate away from the top electrode because the inner microcapsule 32 may have a lower mobility. This will result in a yellow state as illustrated in FIG. 3B.

If a long pulse is applied to the electro-optic medium, wherein the top electrode is negative relative to the bottom electrode, the inner microcapsule 32 and white pigment particles 34 will migrate down towards the bottom electrode. The magenta pigment particles 38 will migrate up towards top electrode and the cyan pigment particles 40 will again occupy the peripheral space around the outside of the inner microcapsule 32 resulting in a magenta state, as illustrated in FIG. 3C.

Finally, applying a similar short pulse to the electro-optic medium in the magenta state, wherein the top electrode is positive relative to the bottom electrode, will cause the cyan pigment particles 40 and magenta pigment particles 38 to switch positions without causing the inner microcapsule 32 to migrate. This will result in the cyan state as illustrated in FIG. 3D.

FIGS. 4A to 4D illustrate an embodiment that comprises the same features and operates in the same fashion as the embodiment in FIGS. 3A to 3D, except that the outer microcapsule 30 has been replaced with a microcell 31.

In yet another embodiment of the present invention, the outer microcapsule or microcell may contain a plurality of inner microcapsules, such that the inner microcapsules are packed and substantially fixed in their respective locations. Any electrophoretic particles also present in the fluid within the outer microcapsules or microcells may migrate between the interstices between the inner microcapsules. For example, referring to FIGS. 5A to 5D, an outer microcapsule 50 contains a fluid, preferably a liquid, a plurality of inner microcapsules 52, and a plurality of electrophoretic particles, such as positively charged magenta pigment particles 58 and negatively charged cyan pigment particles 60. The inner microcapsules 52 similarly may contain a fluid, preferably a liquid, and a plurality of electrophoretic particles, such as positively charged yellow pigment particles 54 and negatively charged white particles 56. The fluid of the inner microcapsule 52 may be the same or different than the fluid of the outer microcapsule 50.

The optical state of the embodiment illustrated in FIGS. 5A to 5D may be switched among white, yellow, magenta, and cyan, similar to the previous embodiments.

Figure 5A:
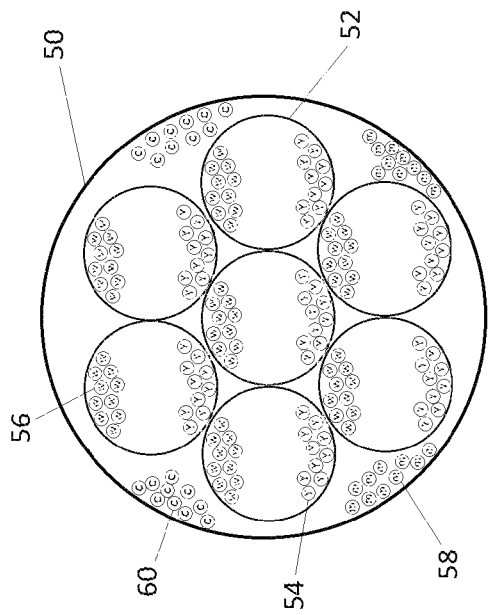
FIG. 5A is a schematic cross-section view of encapsulated microcapsules according to a fifth embodiment of the present invention.

For example, in FIG. 5A, assuming that the electro-optic medium is viewed from the top, applying a long pulse, wherein the top electrode is negative relative to the bottom electrode, the magenta pigment particles 58 will migrate to the top of the outer microcapsule 50, while the cyan pigment particles 60 migrate towards the bottom, resulting in a magenta state.

Figure 5B:
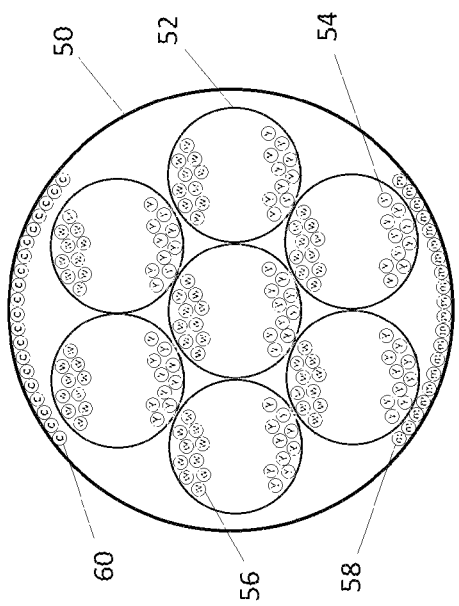
FIG. 5B is a schematic cross-sectional view of the microcapsules of FIG. 5A switched to a second optical state.

In FIG. 5B, applying a moderate pulse to the electro-optic medium in the magenta state, wherein the top electrode is positive relative to the bottom electrode, will cause the white pigment particles 56 to migrate towards the top of the inner microcapsules 52. Also, the strength and duration of the moderate pulse is selected, such that the pulse will drive the magenta pigment particles 58 and cyan pigment particles 60 into the interstices between the inner microcapsules 52 thereby obscuring them from view. This results in a white state.

Figure 5C:
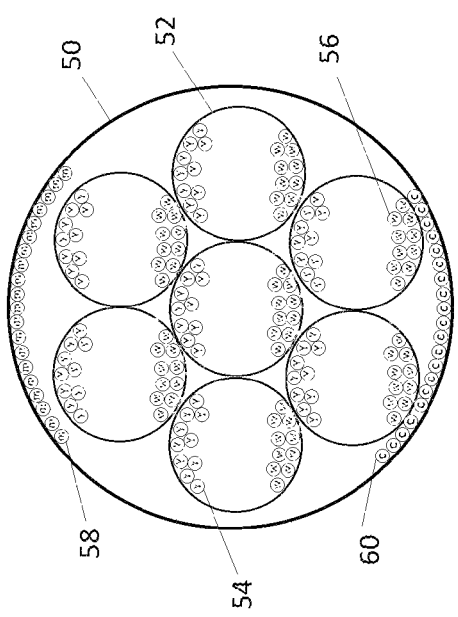
FIG. 5C is a schematic cross-sectional view of the microcapsules of FIG. 5A switched to a third optical state.

In FIG. 5C, applying a short pulse to the electro-optic medium in the white state, wherein the top electrode is negative relative to the bottom electrode, will cause the yellow pigment particles 54 to switch positions with the white pigment particles 56, while maintaining the magenta pigment particles 58 and cyan pigment particles 60 within the interstices. This results in a yellow state for the electro-optic medium.

Figure 5D:
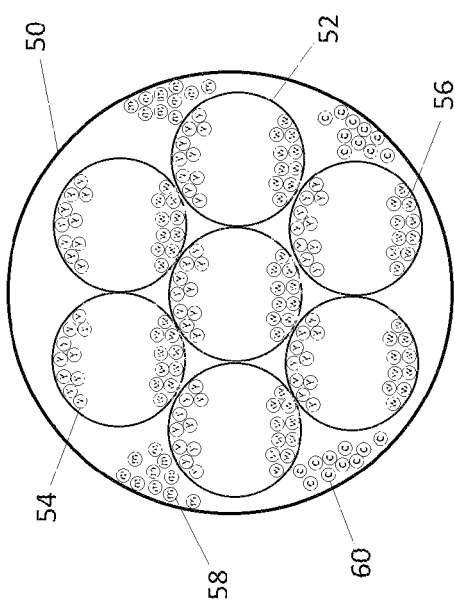
FIG. 5D is a schematic cross-sectional view of the microcapsules of FIG. 5A switched to a fourth optical state.
Figure 6A:
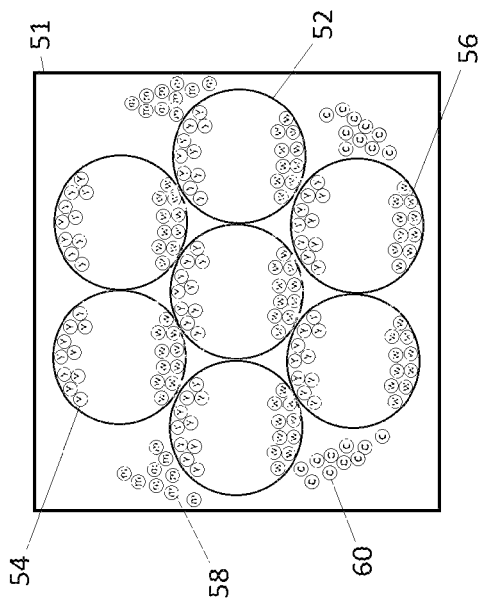
FIG. 6A is a schematic cross-section view of encapsulated microcapsules according to a sixth embodiment of the present invention.
Figure 6B:
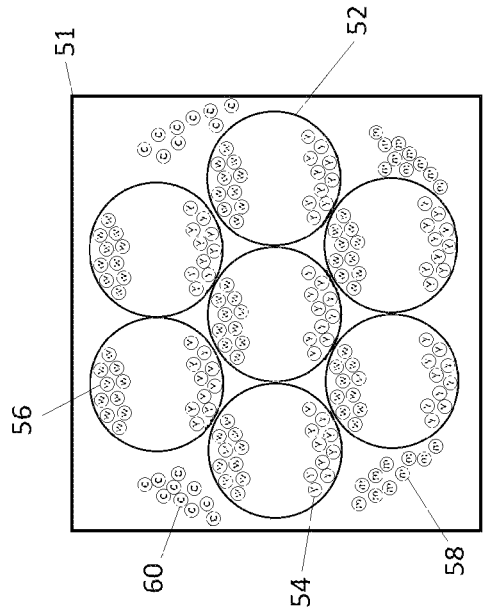
FIG. 6B is a schematic cross-sectional view of the microcapsules of FIG. 6A switched to a second optical state.
Figure 6C:
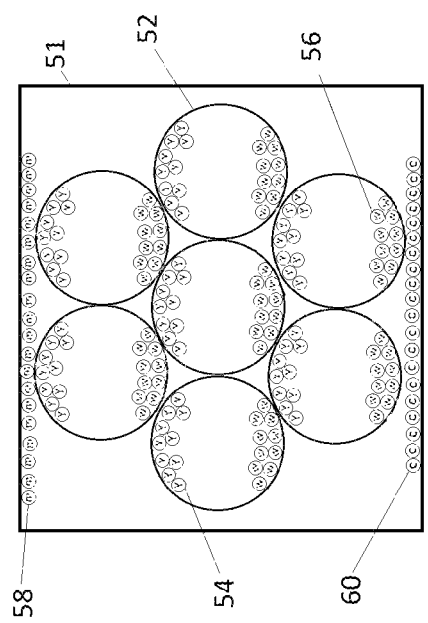
FIG. 6C is a schematic cross-sectional view of the microcapsules of FIG. 6A switched to a third optical state.
Figure 6D:
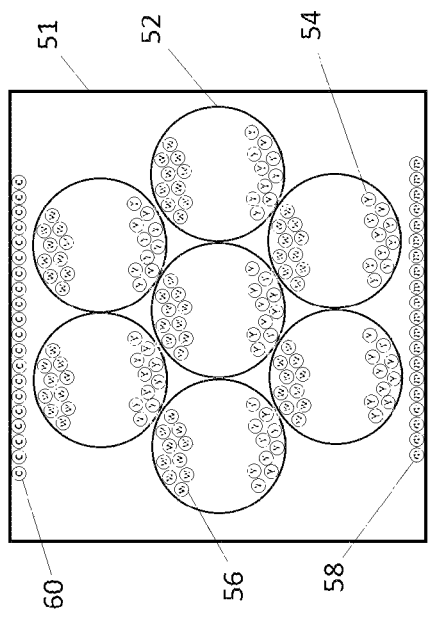
FIG. 6D is a schematic cross-sectional view of the microcapsules of FIG. 6A switched to a fourth optical state.

Finally, in FIG. 5D, after applying a long pulse, wherein the top electrode is positive relative to the bottom electrode, the cyan pigment particles 60 will migrate to the top of the outer microcapsule 50, while the magenta pigment particles 58 migrate towards the bottom, resulting in a cyan state.

FIGS. 6A to 6D illustrate an embodiment that comprises the same features and operates in the same fashion as the embodiment in FIGS. 5A to 5D, except that the outer microcapsule 50 has been replaced with a microcell 51.

Figure 7C:
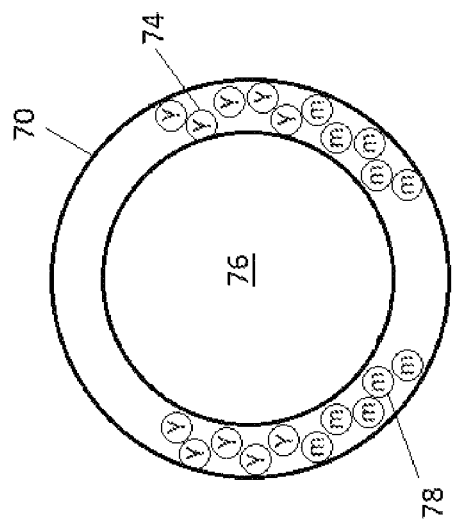
FIG. 7C is a schematic cross-sectional view of the microcapsule of FIG. 7A switched to a third optical state.
Figure 7B:
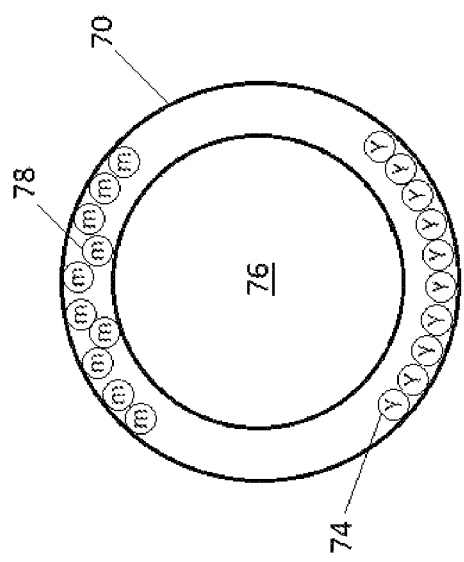
FIG. 7B is a schematic cross-sectional view of the microcapsule of FIG. 7A switched to a second optical state.
Figure 7A:
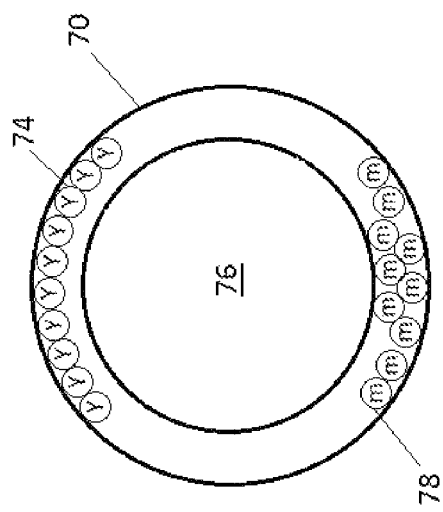
FIG. 7A is a schematic cross-section view of an encapsulated microcapsule according to a seventh embodiment of the present invention.
Figure 8:
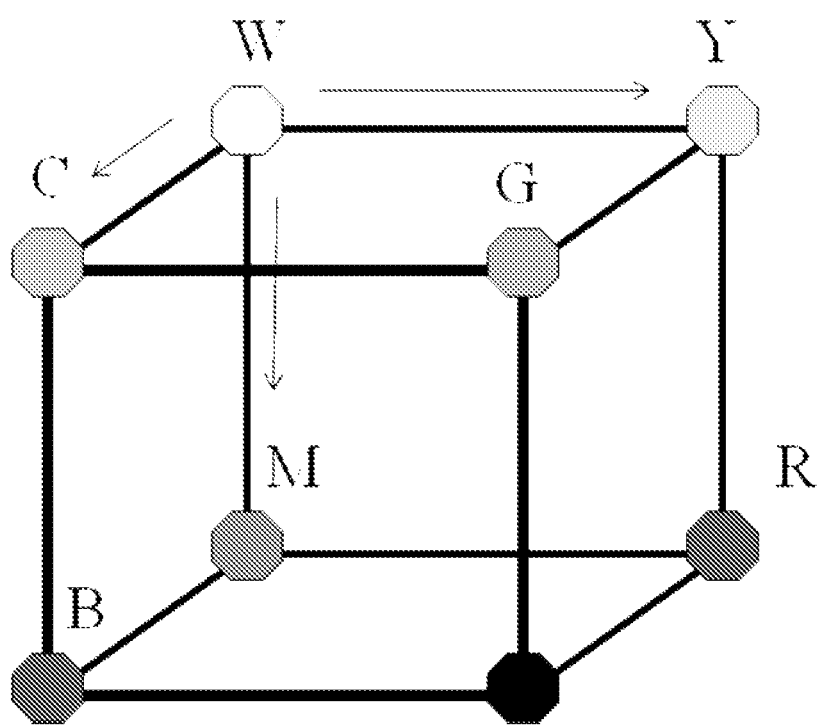
FIG. 8 of the accompanying drawings, as already mentioned, illustrates a simple color cube.

Referring now to FIGS. 7A to 7C, the inner microcapsules described in the previous embodiments may be alternatively replaced with one or more opaque objects, as noted above. For example, a microcapsule 70 may contain a fluid, preferably a liquid, an opaque particle 76, and a plurality of electrophoretic particles, such as positively charged yellow pigment particles 74 and negatively charged magenta pigment particles 78. The opaque particle 76 may be, for example, a white particle having a diameter that is slightly smaller than the diameter of the microcapsule 70, thereby creating a space in the shape of a spherical shell for the electrophoretic particles. Assuming the electro-optic medium is viewed from the top in FIGS. 7A and 7B, a long pulse, wherein the top electrode is either negative or positive relative to the bottom electrode, will result in a yellow or magenta state. Applying a short pulse to the electro-optic medium, may drive the electrophoretic particles to the periphery of the white pigment particle 76, resulting in a white state, as illustrated in FIG. 7C. The size of the spherical shell and size of the electrophoretic particles may be tuned to obtain the desired shuttering effect. Alternatively, the single opaque object illustrated in the embodiment of FIGS. 7A to 7C may be replaced with a plurality of opaque objects, such as opaque particles. For example, the microcapsule or microcell may be packed with a plurality of white pigment particles, such that the white pigment particles do not substantially move within the dispersion of the microcapsule or microcell during switching, and the electrophoretic particles may migrate within the interstices between the packed white pigment particles. In a preferred embodiment, a volume fraction of the plurality of opaque particles in the dispersion may be, with increasing preference in the order given, not less than 1, 2, 3, 4, 5, 10, 15, 20, and 30%.

The electrophoretic particles and dispersions containing the electrophoretic particles incorporated in the various embodiments of the present invention may be obtained using techniques known to those of skill in the art. For example, the materials and methods described in the aforementioned U.S. Pat. Nos. 7,002,728; and 7,679,814, the contents of which are incorporated by reference herein in their entireties, may be used.

The microcapsules used in the various embodiment of the present invention may also be obtained using the materials and methods known to those of skill in the art. For example, the emulsification processes and materials described in U.S. Pat. No. 7,170,670, the content of which is incorporated by reference herein in its entirety, may be used to obtain the inner microcapsules. A desired size of the inner microcapsules may be isolated by known techniques, such as sieving, and then lyophilizing or spray-drying, for example, to remove any water resulting in a substantially dry power of inner microcapsules. The dried microcapsules may then be dispersed in another dispersion with electrophoretic particles that is encapsulated in larger outer microcapsules using the same or similar emulsification techniques. Alternatively, the second emulsification step may be replaced with a microfluidic device, such as a microfluidic dropmaker, that disperses the dispersion containing the inner microcapsules into larger outer microcapsules.

The inner microcapsules formed by the emulsification processes may also be filled in microcells as explained above. Microcells used in the various embodiments of the present invention may be formed from a layer of polymeric material that is subsequently filled and sealed. The layer of polymeric material provided with the microcells, may include, but is not limited to, thermoplastic or thermoset materials or a precursor thereof, such as multifunctional vinyls including, but not limited to, acrylates, methacrylates, allyls, vinylbenzenes, vinylethers, multifunctional epoxides and oligomers or polymers thereof, and the like. Multifunctional acrylate and oligomers thereof are often used. A combination of a multifunctional epoxide and a multifunctional acrylate is also useful to achieve desirable physicomechanical properties of the microcells. A low Tg (glass transition temperature) binder or crosslinkable oligomer imparting flexibility, such as urethane acrylate or polyester acrylate, may also be added to improve the flexure resistance of the film.

The layer of polymeric material comprising the plurality of microcells provides a flexible substrate, thereby enabling the use of various printing or coating techniques, some of which may be inexpensive, in order to fill the microcells with the dispersions containing the electrophoretic particles and microcapsules described above. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.)

The polymeric materials may also comprise a polar oligomeric or polymeric material. Such a polar oligomeric or polymeric material may be selected from the group consisting of oligomers or polymers having at least one of the groups such as nitro (—NO2), hydroxyl (—OH), carboxyl (—COO), alkoxy (—OR wherein R is an alkyl group), halo (e.g., fluoro, chloro, bromo or iodo), cyano (—CN), sulfonate (—SO3) and the like. The glass transition temperature of the polar polymer material is preferably below about 100° C. and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Alternatively, the polymeric material may comprise (a) at least one difunctional UV curable component, (b) at least one photoinitiator, and (c) at least one mold release agent. Suitable difunctional components may have a molecular weight higher than about 200. Difunctional acrylates are preferred and difunctional acrylates having a urethane or ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl)phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenylketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1 [4-(methylthio)phenyl]-2-morpholinopropan-1-one. Suitable mold release agents may include, but are not limited to, organomodified silicone copolymers such as silicone acrylates (e.g., Ebecryl 1360 or Ebecryl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

The preferred method of providing the polymeric material with microcells is by applying a pattern of microstructures on one surface of the polymeric material, such as the methods described in U.S. Pat. No. 6,930,818, the content of which is incorporated herein by reference in its entirety. For example, a drum having a three-dimensional pattern on its outer surface may be used to emboss a continuous sheet of polymeric material in a roll-to-roll process. The pattern on the surface of the drum may be in the form of a plurality of microposts, for example.

Sealing of the microcells may be accomplished by applying a layer of sealing material over the filled microcells. The layer of sealing material for sealing the microcells may be applied using various techniques. For example, sealing may be accomplished by dispersing a thermoplastic or thermoset precursor in the dispersion fluid, wherein the thermoplastic or thermoset precursor is immiscible in the dispersion fluid and has a specific gravity lower than that of the display fluids. After filling the microcells with the precursor/dispersion mixture, the precursor phase separates from the dispersion and forms a supernatant layer which is then hardened or cured by solvent evaporation, interfacial reaction, moisture, heat or radiation. Specific examples of thermoplastics or thermosets and precursors thereof may include materials such as monofunctional acrylates, monofunctional methacrylates, multifunctional acrylates, multifunctional methacrylates, polyvinyl alcohol, polyacrylic acid, cellulose, gelatin or the like. Additives such as a polymeric binder or thickener, photoinitiator, catalyst, vulcanizer, filler, colorant or surfactant may be added to the sealing composition to improve the physico-mechanical properties and the optical properties of the display.

In another more preferably method, sealing may be accomplished by applying a sealing layer comprising an aqueous composition over the dispersion-filled microcells that is subsequently dried. In an aqueous composition, the sealing material may be an aqueous solution of a water soluble polymer. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrolidone) and its copolymers such as poly(vinylpyrrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly(methacrylic acid), its salt forms, and its copolymers; poly(maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2-methacryloxyethyltrimethylammonium bromide), poly(allylamine hydrochloride). The sealing material may also include a water dispersible polymer dispersed in water. Examples of suitable polymer water dispersions may include polyurethane water dispersions and latex water dispersions. Suitable latexes in the water dispersions include polyacrylate, polyvinyl acetate and its copolymers such as ethylene vinyl acetate, and polystyrene copolymers such as polystyrene butadiene and polystyrene/acrylate.

The fluid encapsulated within the microcapsules and microcells of the various embodiments of the present invention may include various solvents. The solvent may be a fluid, preferably a liquid that is clear and colorless, and more preferably a fluid with a refractive index that matches the refractive index of the light transmissive microcells and/or sealing layer. Examples of suitable solvents include hydrocarbons such as hexane, isopar, decahydronaphthalene (DECALIN), 5-ethylidene-2-norbornene, fatty oils, paraffin oil, silicon fluids, aromatic hydrocarbons such as toluene, xylene, phenylxylylethane, dodecylbenzene or alkylnaphthalene, halogenated solvents such as chloroform, perfluorodecalin, perfluorotoluene, perfluoroxylene, dichlorobenzotrifluoride, 3,4,5-trichlorobenzotri fluoride, chloropentafluoro-benzene, dichlorononane or pentachlorobenzene, and perfluorinated solvents such as FC-43, FC-70 or FC-5060 from 3M Company, St. Paul Minn., low molecular weight halogen containing polymers such as poly(perfluoropropylene oxide) from TCI America, Portland, Oreg., poly(chlorotrifluoro-ethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC –200).

The contents of all of the patents and patent applications identified above are incorporated herein by reference in their entireties.

EXAMPLE

The following example is given as an illustrative embodiment of the present invention, and is not intended to limit the scope of the invention.

Magenta pigment was dispersed in Isopar® G at 2% wt with 600 mg/g Solsperse® 17 k. Approximately 40% wt freeze dried microcapsules containing black and white pigment particles was added to dispersion and approximately 1% wt of glass beads (105-150 µm, Polysciences Cat. No. 15927). The dispersion was placed between two parallel slabs of ITO/glass. A drop of dispersion was applied on the bottom glass and gently spread with the top glass. The large glass beads enforced a minimum spacing between the glass slabs, so that rupture of the microcapsules was avoided. The edges of the cell were then sealed using an epoxy.

With appropriate electrical driving, the white/black pigment inside the capsules could be switched, and independently the magenta pigment could be switched between the top and bottom of the test cell, passing between the packed microcapsules. To achieve this, the fluid carrying the magenta pigment outside of the microcapsules was provided with a lower viscosity than the fluid within the microcapsules. A low voltage was not capable of driving the black and white pigment inside the microcapsules, but was able to drive the magenta pigment particles outside of the microcapsules. High voltage was able to drive all particles. Specifically, driving at 40V AC switched the inside of capsules, black-white, within less than a second, while driving at 5V AC did not switch the pigment particles inside the microcapsules, but did switch the magenta pigment particles outside the microcapsules.

It was observed that in the regions of the cell in which the microcapsule pack spanned the full gap between the glass slabs, the microcapsules were mechanically jammed and thus stationary, and the magenta pigment particles passed through the interstitial spaces between the microcapsules. In the regions where the microcapsule failed to span the full gap between the glass slabs, the microcapsules moved vertically between the slabs in response to the electric field in the opposite direction to the magenta pigment particles, so that either the magenta particles or the microcapsules could be driven adjacent to the top slab.

Based on whole-device (macroscopic) reflectance measurements, the "white", "black", and "magenta" states of the device were characterized. The most successful drive scheme was 20 Hz AC at +/−30 V, with adjustable DC offset. The measured optical states as a function of DC offset are provided in Table 1:

TABLE 1

| DC offset | Color designation | Reflectance at 650 nm | Reflectance at 550 nm | Reflectance at 450 nm |
|---|---|---|---|---|
| +60 V | "white" | 11.5% | 5.77% | 11.8% |
| −10 V | "magenta" | 6.2% | 0.47% | 3.6% |
| −60 V | "black" | 3.5% | 0.14% | 1.8% |

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic medium comprising:
   a first microcapsule containing a first dispersion, the first dispersion comprising a first plurality of electrophoretic particles; and
   an encapsulated second dispersion comprising the first microcapsule and a second plurality of electrophoretic particles.

2. The electro-optic medium of claim 1, wherein the second dispersion is encapsulated within a second microcapsule.

3. The electro-optic medium of claim 1, wherein the second dispersion is encapsulated within a microcell.

4. The electro-optic medium of claim 1, wherein the first plurality of electrophoretic particles comprises a first and second set of charged colored particles, the color of the first set being different than the color of the second set.

5. The electro-optic medium of claim 4, wherein the charge of the first set is an opposite polarity relative to the charge of the second set.

6. The electro-optic medium of claim 5, wherein the second plurality of electrophoretic particles comprises a third set of charged colored particles, the color of the third set being different than the color of the second set.

7. The electro-optic medium of claim 6, wherein the color of the first, second, and third set of charged colored particles is selected from the group consisting of yellow, magenta, cyan, red, green, blue, black, and white.

8. The electro-optic medium of claim 1, wherein the first microcapsule is charged.

9. The electro-optic medium of claim 8, wherein the first plurality of electrophoretic particles comprises a first and second set of charged colored particles, the color of the first set being different than the color of the second set.

10. The electro-optic medium of claim 9, wherein the charge of the first set is an opposite polarity relative to the charge of the second set.

11. The electro-optic medium of claim 10, wherein the second plurality of electrophoretic particles comprises a third set of charged colored particles.

12. The electro-optic medium of claim 11, wherein the second plurality of electrophoretic particles further comprises a fourth set of charged colored particles.

13. The electro-optic medium of claim 12, wherein the color of the third set being different than the color of the fourth set.

14. The electro-optic medium of claim 13, wherein the color of the first, second, third, and fourth set of charged colored particles is selected from the group consisting of yellow, magenta, cyan, red, green, blue, black, and white.

15. The electro-optic medium of claim 13, wherein at least one of the first, second, third, and fourth sets of charged colored particles has a greater mobility than the a mobility of the charged first microcapsule.

16. The electro-optic medium of claim 1, wherein the encapsulated second dispersion comprises a plurality of first microcapsules.

17. An electro-optic medium comprising a microcapsule containing a dispersion, the dispersion comprising a fluid, a plurality of opaque objects and a plurality of electrophoretic particles,
   wherein a volume fraction of the plurality of opaque objects in the dispersion is at least 1%.

18. An electro-optic medium encapsulated within a microcell, the medium comprising a dispersion, the dispersion comprising a fluid, a plurality of opaque objects and a plurality of electrophoretic particles,
   wherein a volume fraction of the plurality of opaque objects in the dispersion is at least 1%.

* * * * *